Feb. 18, 1969  E. E. FRENCH  3,428,365
ADJUSTABLE BOLT CIRCLE WHEEL
Filed Feb. 21, 1967

INVENTOR
Elby E. French
BY Walter H. Schneider
ATTORNEY

United States Patent Office 3,428,365
Patented Feb. 18, 1969

3,428,365
ADJUSTABLE BOLT CIRCLE WHEEL
Elby Edward French, Littleton, Colo., assignor to O.K. Tire and Rubber Co., Inc., Houston, Tex., a corporation of Delaware
Filed Feb. 21, 1967, Ser. No. 617,539
U.S. Cl. 301—9                                     5 Claims
Int. Cl. B60b 27/00, 3/14

ABSTRACT OF THE DISCLOSURE

A vehicular wheel having a plurality of apertures in a circular array about the wheel hub, for removably receiving lugs provided with eccentric bolt holes. Each aperture is provided with three angularly spaced keyways; and each lug has a key extending therefrom for insertion in a selected one of the keyways, so that each lug can be positioned in any of at least three different positions within its aperture, to variably space the eccentric bolt hole in the lug from the axis of the wheel.

Background of the invention

Wheels adapted to be mounted on the brake drums of an automobile or truck are normally provided with a plurality of bolt holes spaced from one another in a circular array having a diameter determined by the spacing of mounting bolts projecting from said brake drum. Any particular automotive manufacturer customarily adopts a particular bolt circle diameter for its wheels; and the bolt circle diameter often varies from one to another automotive manufacturer, and may, indeed, vary from year to year for even the same automotive manufacturer. Thus, automotive products manufactured by the Chrysler Corporation require wheels having a 4½" diameter bolt circle; automobiles manufactured by certain divisions of the General Motors Corporation require a 5" diameter bolt circle; still other automobiles manufactured by other divisions of the General Motors Corporation require a 4¾" bolt circle, etc.

In years past, when an automobile owner has purchased an extra wheel for his automobile, e.g. to mount snow tires or the like, he has been required to make certain that the particular wheel purchased has a bolt circle diameter appropriate for his particular automobile; and a dealer in automotive parts has been required to stock a relatively large inventory of wheels, having various different bolt circle diameters. If the car owner replaces his automobile with one of another year, model or manufacturer, the extra wheel is often rendered useless for mounting on the new vehicle. A similar situation has occurred with respect to so-called "sport" wheels, comprising cast aluminum spoked wheels sold for use in replacing the wheels provided as original equipment on an automobile. Dealers in such spoked wheels have again been required to maintain a relatively large inventory, in order to assure that sport wheels having all the necessary bolt circle diameters will be available for sale; and the purchaser has found that, if he changes his car, the resulting change in bolt circle diameter may render his relatively expensive sport wheels useless on the new car.

Various efforts have been made heretofore to provide wheels of a somewhat more standardized nature. These efforts have included wheel adapters of the type shown in Martin U.S. Patent No. 3,025,109. However, such adapter structures are relatively complex and costly, are relatively unsightly thereby rendering them undesirable for use in sport wheel structures; and, moreover, require an adapter plate having properly drilled holes therein, which plate must be exchanged for an entirely different plate in the event that the wheel is to be employed on a vehicle having a different bolt circle diameter. This latter requirement, in itself, makes the adaptation less than universal, since one owning the structure is often required to purchase additional or new replacement elements in order to adapt his old wheel to a new vehicle.

Other structures have been suggested, e.g. of the type shown in Adair Patent No. 2,590,363, comprising a wheel having a special slot arrangement adapted to receive bolts on various different diameter bolt circles. Structures of this type are again relatively unattractive, and they are capable, at best, of only temporary use since the nuts tend to slip or bear unevenly on the wheel, resulting in misalignment and unbalancing of the wheel if extended use is attempted.

In an effort to minimize these problems, the Wheel Centre Company, Inc., of Walnut Creek, Calif., has marketed a sport wheel having a plurality of elongated apertures extending in generally radial directions and spaced in a circular array about the wheel hub. Each of these elongated apertures is adapted to receive an elongated lug having a bolt hole therein; and different types of lugs, respectively having a bolt hole at various different locations in the lug, can be purchased for insertion in said elongated apertures to achieve any one of a plurality of bolt circle diameters. One of the lug types provided in this arrangement has an off-center bolt hole therein; and this particular lug type can be inserted in its complementary elongated aperture in either of two positions, 180° displaced from one another, whereby either of two different bolt circle diameters can be achieved by appropriately inserting the lug in the proper one of its two possible positions. Since automobiles of United States and foreign manufacture presently have at least three different standard bolt circle diameters, however, even this known arrangement provides for only limited interchangeability of wheels from one car to another, and often requires that new lugs, having different bolt hole locations, be purchased if it is desired to transfer the sport wheel from one automobile to another.

Summary of the invention

The present invention obviates all of the various difficulties discussed above. The invention comprises a wheel having a plurality of apertures angularly spaced from one another in a circular array surrounding and concentric with the hub section, and these apertures are associated with a plurality of removable lugs which can be inserted in said apertures, and retained in place, in any one of at least three different positions. Each of the lugs is provided with a bolt hole; and the actual distance between the center of the bolt hole in a given lug, and the center of the wheel, varies with variations in the position of the lug within its aperture. Thus, the parts originally purchased by the user are immediately adapted to provide three different bolt circle diameters; and by appropriate extension of the invention, in the manner to be described, even more than three possible bolt circle diameters may be provided without the need of purchasing any additional parts when the wheel is to be transferred from one vehicle to another.

The lugs and apertures have cooperating surfaces in abutment with another for fixedly retaining each of the lugs in any one of at least three different positions. These cooperating surfaces, in one embodiment of the invention, can comprise a key disposed on each lug, and a plurality of keyways provided in the cooperating wheel aperture. Other arrangements will, however, be apparent including wheel apertures and cooperating lugs which are of square, hexagonal, octagonal, serrated, or other irregular configurations.

The arrangement of the present invention, in addition to permitting more than two bolt circle diameters to be achieved without the need of purchasing any replacement parts, achieves this result in a structure which is highly attractive, thereby rendering it commercially feasible for use in sport wheels. Moreover, the structure is mechanically sound thereby permitting the wheel to be used in long-time and high-speed environments without any danger of misalignment, unbalancing, or the like.

It is accordingly an object of the present invention to provide a wheel having an improved arrangement for adjusting the bolt circle diameter thereof. Another object of the present invention resides in the provision of a wheel having a bolt circle diameter adjustable to at least three different diameters, without requiring the purchase or installation of replacement parts. A further object of the present invention resides in the provision of an adjustable bolt circle wheel which is relatively simple to manufacture, which can be manufactured in highly attractive forms; and which exhibits excellent mechanical stability consistent with safety requirements.

Brief description of the drawings

The foregoing objects, advantages, construction and operation of the present invention will become more readily apparent from the following description and accompanying drawings in which.

Description of the preferred embodiments

Referring initially to FIGURES 1, 2, 2A and 2B, it will be seen that a wheel constructed in accordance with the present invention may comprise a centrally located hub section 10, a rim section 11 concentric with said hub section 10, and substantially radially extending structural means 12 disposed between said hub section 10 and rim section 11. The various parts 10, 11, and 12 are preferably integral with one another, and comprise for example, a high strength aluminum alloy.

Figure 1:
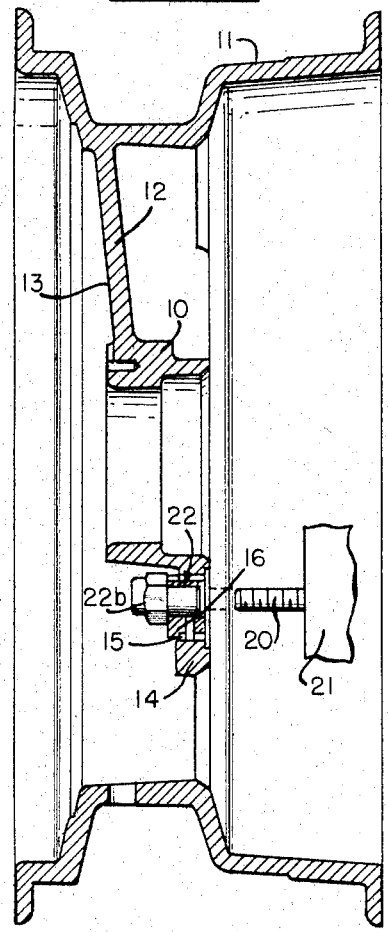
FIGURE 1 is a side cross-sectional view of a wheel constructed in accordance with one embodiment of the present invention.
Figure 2:
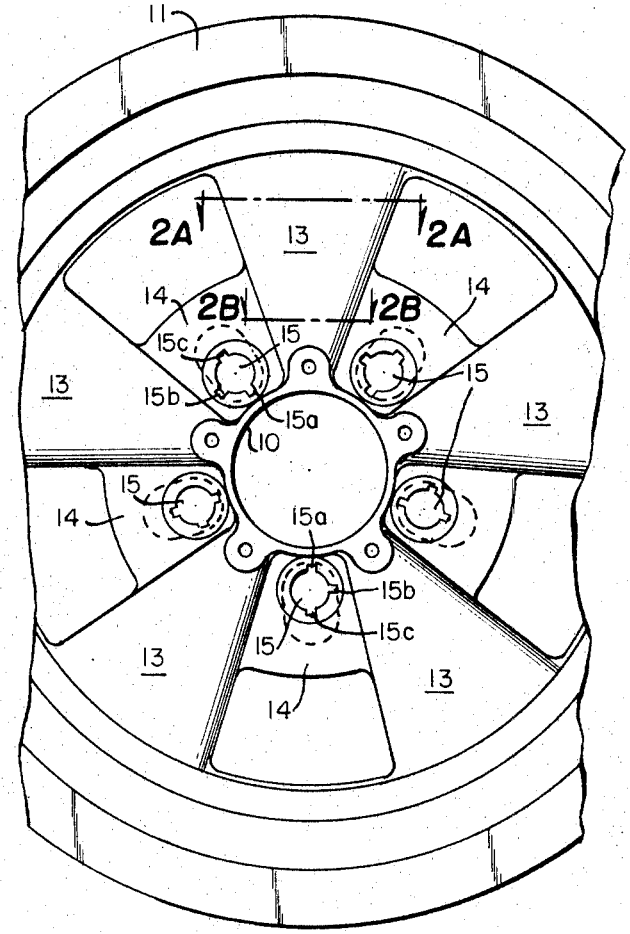
FIGURE 2 is a front elevation of a portion of the wheel shown in FIGURE 1.
Figure 2A:
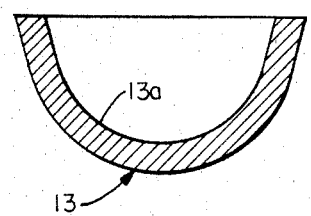
FIGURES 2A and 2B are cross-sectional views of a spoke of the wheel of FIGURE 2, taken on lines 2A—2A and 2B—2B of FIGURE 2 respectively.
Figure 2B:
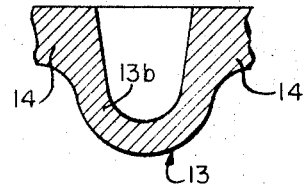
Figure 3:
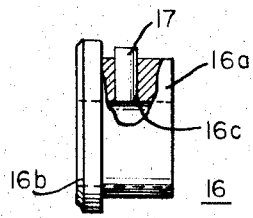
FIGURE 3 is a side view, in partial section, of a universal lug adapted for use in the wheel of FIGURE 2.

In the particular embodiment shown in the drawings, the wheel is intended for use as a sports wheel; and the structural means 12 preferably take the form of a plurality of spokes 13 angularly spaced from one another in the manner best shown in FIGURE 2. Each of the spokes 13 is preferably of tapered curved cross section defining an outermost relatively wide arcuate section 13a (see FIGURE 2A) tapering to a narrower curved section 13b (see FIGURE 2B). The narrower end of each spoke 13 is preferably formed to provide radial flange means 14 which extend between the rear edges of the several spokes 13 in the manner shown in FIGURE 2.

Each of the flange means 14 is provided with an aperture 15, which is preferably of generally circular cross-section as shown. The several apertures 15 are disposed in a circular array about and concentric with the axis of the wheel, and each aperture 15 has at least three keyways cut into its periphery, these being designated 15a, 15b, and 15c. Keyways 15a and 15c are preferably in alignment with one another along a radius passing through the axial center of the wheel; and keyway 15b is angularly displaced from keyways 15a and 15c by a distance substantially equidistant between them. In a preferred embodiment of the invention, the inner diameter of each of the apertures 15 is substantially 1"; and the several keyways 15a, 15b, and 15c preferably have dimensions of 3/16" x 5/64".

The several apertures 15 are each adapted to receive a universal lug 16 of the type shown in FIGURES 1 and 3 through 6. Each lug 16 includes a cylindrical barrel 16a having an enlarged collar 16b at one end thereof; and each lug further defines a bore 16c of circular cross-section extending therethrough. In order to adapt the lug 16 for use in achieving bolt circle diameters of 4½, 4¾", and/or 5", the axial center of each bore 16c is displaced from the axial center of the barrel 16a (and the axial center of aperture 15) by 1/8". The barrel portion 16a of each lug is drilled radially to receive a roll pin 17 having a protruding end acting as a key for insertion in a selected one of the three keyways 15a, 15b, and 15c.

The outer diameter of barrel portion 16a in each lug 16 is complementary in size and configuration to the inner diameter of each of apertures 15. Due to the eccentric disposition of bore 16c in each lug 16, the actual distance between the axis of the bores 16c and the axial center of the wheel varies with variations in the position of the several lugs in their respective apertures 15. When the several lugs 16 are inserted in their receiving apertures 15 in such manner that their keys 17 are all disposed in keyways 15a, the axis of the several bores 16c will be furthest displaced from the center axis of the wheel; and the positioning of the several apertures 15, and the positioning and dimensions of bores 16c, are so selected that, by so utilizing keyways 15a, a 5" diameter bolt circle is effected between the various centers of the several bores 16c. If each of lugs 16 is turned through 180°, so that the several keys 17 are received in the several keyways 15c, the axis of each bore 16c will be moved inwardly by a distance of ¼" (due to the 1/8" eccentricity described previously) thereby reducing the bolt circle diameter to 4½". If the several lugs 16 are inserted with their keys 17 in alignment with the keyways 15b, the axial centers of the several bores 16c will be located to produce a bolt circle diameter of 4¾". Thus, the structure is immediately capable of achieving the three standard bolt circle diameters presently utilized on all automobiles of U.S. manufacture.

Figure 4:
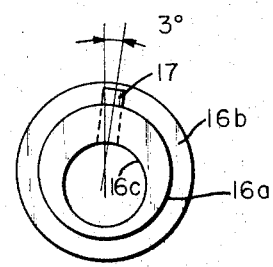
FIGURE 4 is a rear view of the lug shown in FIGURE 3.
Figure 5:
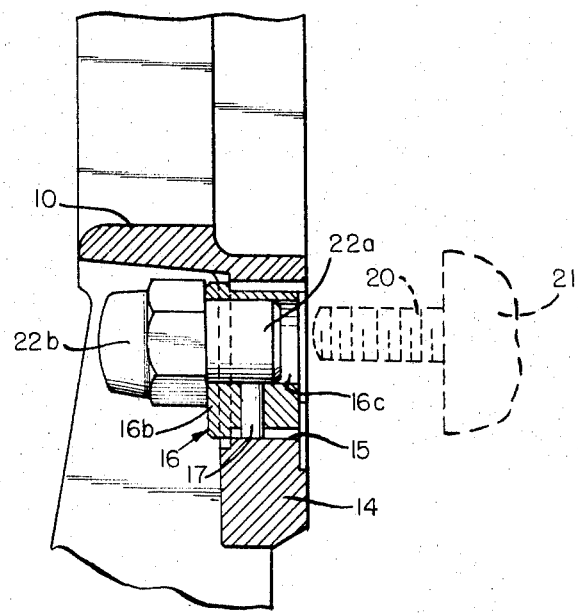
FIGURE 5 is a detailed view of a portion of the structure shown in FIGURE 1.
Figure 6:
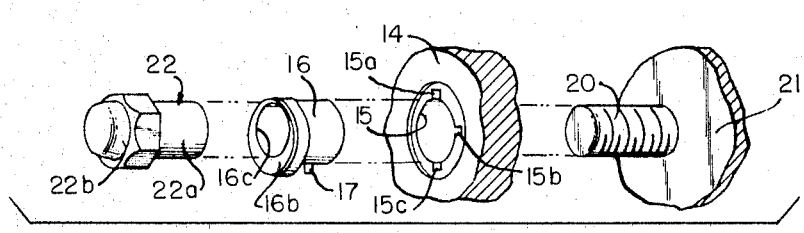
FIGURE 6 is an exploded view illustrating the assembly of certain parts shown in FIGURES 1 and 5.

In the specific design illustrated in the drawings, since the bore 16c is 1/8" off-center to the aperture 15, the lug bore 16c is preferably rotated slightly, through an angle of approximately 3°, to place the lug bore directly on the 4¾" bolt circle when this lug position is selected. If this is not done, there tends to be too much error at the 4¾" bolt circle location. This consideration is shown in FIGURE 4, and can be achieved by displacing key 17 through an angle of 3° to the center line of lug 16, as illustrated. This 3° angular displacement of the key 17 also affects the bolt circle when the lug is placed in its 4½" or 5" position; but since keyways 15a and 15c are on a radial of the wheel, the effect is only a variation of about 0.0007" at the 4½" and 5" settings, which is well within workable tolerance. A similar result could, of course, be accomplished by displacing the keyways 15a, 15b, and 15c through a 3° angle, and then placing the key or pin 17 in the lug on the center line thereof.

When inserted in place, the several keys 17 prevent any rotation of the lugs 16 in their respective apertures. The enlarged collar 16b bears on the outer surface of flange means 14 (which outer surface can be slightly recessed, if desired, to receive said collar) to prevent inward axial motion of the lug 16. The several bores 16c, located on their appropriate bolt circle diameter, are adapted to receive bolts 20 extending from brake drum 21. A lug nut 22 having an internally threaded barrel 22a and an outer hexagonal nut section 22b can then be inserted into each lug bore 16c for thread engagement with the bolt 20 in that bore.

The overall structure is, it will be appreciated, extremely stable mechanically and, moreover, is adapted to achieve at least three different bolt circle diameters without requiring the replacement or substitution of any parts. Thus, one who has purchased a sport wheel having the construction described can be certain that those wheels will be adapted for use on any other car which he may subsequently buy without the need of purchasing any replacement parts, or making any changes in the structure other than the relocation of the lugs 16 to their proper angular position in wheel apertures 15.

It will further be appreciated that, while three keyways have been shown, to permit three bolt circle diameters to be achieved, more than three keyways can be provided to adapt the structure to more than three bolt circle diameters. Indeed, the interior surface of the various apertures 15 can be of serrated configuration; and the outer diameter of each of the lug barrels 16a can similarly be serrated, thereby permitting the barrels to be inserted in substantially any desired angular position through 360°, and to be firmly retained against rotation in the selected position. Other configurations of lug and receiving aperture can also be utilized to produce cooperating surfaces in abutment with one another for fixedly retaining the lugs against rotation in any one of three or more insert positions; e.g. the lugs and receiving apertures may be square, or hexagonal, or octagonal, or of any other desired even irregular shape so long as the plurality of stable lug positions contemplated by the present invention can be achieved.

Having thus described my invention, I claim:

1. An adjustable bolt circle wheel comprising a rim section, a hub section coaxial with said rim section, and radially extending structural means interconnecting said rim and hub sections, said structural means defining a plurality of apertures each of which is substantially circular in cross section, said apertures being spaced from one another in a circular array surrounding and concentric with said hub section, a plurality of removable lugs of substantially circular cross section, said lugs being inserted in said plurality of apertures respectively, said lugs and apertures having cooperating surfaces in abutment with one another for fixedly retaining each of said lugs in any one of at least three different positions within its respective aperture, said three different lug positions being angularly spaced from one another about a common axis, each of said lugs defining a bolt hole extending therethrough disposed off-center of the axis of said lug, the distance between the axis of said bolt hole in each of said lugs and the axis of said hub section being dependent upon the position of said lug in its respective aperture, whereby said lugs may all be positioned in corresponding first positions in their respective apertures to define a bolt hole circle of a first diameter, said lugs may all be positioned in corresponding second positions in their respective apertures to define a bolt hole circle of a second diameter different from said first diameter, and said lugs may all be positioned in corresponding third positions in their respective apertures to define a bolt hole circle of a third diameter different from both said first and second diameters, said cooperating surfaces comprise a key extending outwardly of each of said lugs in a direction transverse to the axis of said lug, and a plurality of keyways angularly spaced from one another about each of said bolt holes.

2. The wheel of claim 1 wherein two of said keyways are disposed in alignment with one another, on opposite sides of said bolt hole, along a radial passing through the axis of said wheel.

3. An adjustable bolt circle wheel comprising a rim section, a hub section coaxial with said rim section, and radially extending structural means interconnecting said rim and hub sections, said structural means defining a plurality of apertures spaced from one another in a circular array surrounding and concentric with said hub section, a plurality of removable lugs inserted in said plurality of apertures respectively, said lugs and apertures having cooperating surfaces in abutment with one another for fixedly retaining each of said lugs in any one of at least three different positions within its respective aperture, each of said lugs defining a bolt hole extending therethrough, the distance between the axis of said bolt hole in each of said lugs and the axis of said hub section being dependent upon the position of said lug in its respective aperture, whereby said lugs may all be positioned in corresponding first positions in their respective apertures to define a bolt hole circle of a first diameter, said lugs may all be positioned in corresponding second positions in their respective apertures to define a bolt hole circle of a second diameter different from said first diameter, and said lugs may all be positioned in corresponding third positions in their respective apertures to define a bolt hole circle of a third diameter different from both said first and second diameters, each of said apertures being of circular cross section, each of said lugs comprising a cylindrical barrel inserted into one of said apertures, said barrel having a bore extending therethrough to define said bolt hole, an enlarged collar at one end of said cylindrical barrel engaging a facing surface of said flange means for restricting axial movement of said lug in its respective aperture, said cooperating surfaces comprising substantially radially extending abutments disposed between portions of said barrel and aperture for restricting rotary movement of said lug in its respective aperture.

4. The wheel of claim 3 wherein said radially extending abutments comprise a key extending outwardly from the barrel of said lug in spaced relation to said collar, and a plurality of spaced recesses communicating respectively with the inner surface of each of said apertures.

5. The wheel of claim 4 wherein each of said keys defines sides extending at an angle of substantially 3° to a radial of its respective cylindrical barrel.

References Cited

UNITED STATES PATENTS

| | | | |
|---|---|---|---|
| 1,889,837 | 12/1932 | Michelin | 301—9 |
| 3,006,443 | 10/1961 | Siler. | |
| 3,329,468 | 7/1967 | Beith | 301—65 X |

RICHARD J. JOHNSON, *Primary Examiner*

U.S. Cl. X.R.

301—65